Sept. 29, 1953  J. ROSENBAUM  2,654,066
Q METER
Filed Nov. 5, 1951

INVENTOR.
JACOB ROSENBAUM
BY
Samuel J Snyder
ATTORNEY

Patented Sept. 29, 1953

2,654,066

UNITED STATES PATENT OFFICE 2,654,066

Q METER

Jacob Rosenbaum, Spring Valley, N. Y.

Application November 5, 1951, Serial No. 254,836

10 Claims. (Cl. 324—57)

This invention relates to new and improved apparatus for the measurement of electrical constants of circuits and electrical elements. The invention is especially concerned with apparatus for measuring the "Q," inductance, capacity, and other characteristic of elements adapted to be used particularly in radio and audio-frequency circuits.

It is an object of this invention to provide apparatus which will be free of certain serious defects of Q-meters and similar instruments now commonly used for making such measurements.

The symbol Q designates the ratio of the reactance to the resistance of an element or a circuit. For an inductance coil, therefore, $Q=2\pi f L/R$; and a condenser $Q=1/2\pi f C R$, where $f$ is frequency, L is inductance, C is capacity, and R is resistance. The Q of a resonant circuit is equal to the ratio of the reactance of the condenser or inductance to the resistance of the entire circuit. It can be readily shown that if an A. C. voltage $E_i$ is placed in series with a circuit resonant thereto, the voltage $E_0$ across the condenser, as well as the voltage across the inductance coil, will be $E_0=QE_i$. This property of Q, namely, that it is the voltage step-up factor of a resonant circuit, is the one utilized usually in constructing a Q-meter. Thus, a Q-meter consists essentially of a circuit for resonating the element to be measured, an oscillator for injecting a voltage of a desired frequency in series with the resonant circuit, and meters for measuring the injected voltage and the voltage across the resonant circuit. The ratio of these voltages equals the Q of the element being measured.

One of the problems in the construction of a Q-meter concerns the introduction of the required energizing audio or radio frequency voltage into the resonant circuit which includes the element or circuit to be measured. In order to avoid errors, it is necessary that the voltage be impressed on the resonant circuit without introducing appreciable resistance or reactance into the resonant circuit. It is also necessary to measure the voltage impressed on the resonant circuit. In one type of Q-meter now in common use, a small resistance is connected in series in the resonant circuit and the output of an oscillator is connected across the resistance. The resistance is required to be non-reactive, only a few hundredths of an ohm large, and yet very accurate. In order to provide such a small non-reactive resistance, an elaborate construction is resorted to. It is one of the objects of my invention to introduce the output of the oscillator into the resonant circuit by the use of a very simple, inexpensive and reliable device.

Another disadvantage of presently existing Q-meters is that the voltage fed by the energizing oscillator to the resonant circuit is measured by means of a thermocouple and a D. C. indicating meter. The thermocouple is very liable to damage by excessive currents produced during the adjustment of the Q-meter or by line voltage surges. Such damage to the thermocouple occurs frequently. It is then necessary to provide a substitute specially calibrated thermocouple and to recalibrate the milliameter operating in conjunction therewith. It is accordingly another object of my invention to avoid this defect of existing Q-meters by providing a simple and accurate means for measuring the voltage injected into the resonant circuit, which means is practically immune to overloading and damage.

The above described advantages and other advantages of my invention are achieved by coupling the oscillator to the resonant circuit by means of an extremely thin walled tube. One end of the tube may be connected to the oscillator and the tube grounded at a point electrically remote from said end. A portion of the tube is connected in series in the resonant circuit. Consequently a portion of the voltage impressed on said tube by the oscillator is fed into the resonant circuit. The walls of the tube are made so thin that the high frequency current is conducted almost uniformly throughout the thickness of the tube for all frequencies throughout the range of the oscillator. Thus the variation of the resistance of the tube with frequency due to the skin effect, is eliminated or greatly reduced. The length of the tube is made so small relative to a wave length that the reactance of the tube is negligible at all operating frequencies. Despite the short length of the tube, its resistance is appreciable because of the thinness of the walls thereof. In another embodiment of the invention the tube used for coupling the oscillator to the resonant circuit is provided with a coaxial conductor therein. One end of the conductor may be connected to the oscillator and the other end short circuited to the tube itself. The tube is grounded at a point remote from the short circuiting connection, and a portion of the tube is connected in series in the resonant circuit. The voltage impressed on the resonant circuit and the voltage developed across the resonant circuit are measured as follows. A rectifier and a load therefor are connected from the input to the coupling tube to ground, and another rectifier and load therefor are connected across the resonant circuit. A single vacuum tube voltmeter and suitable switching means are then employed to measure the voltage across either of said loads.

The invention consists substantially in the construction combination and arrangement of the parts and circuits more fully described hereinafter and shown in the accompanying drawings, wherein.

Figure 1:
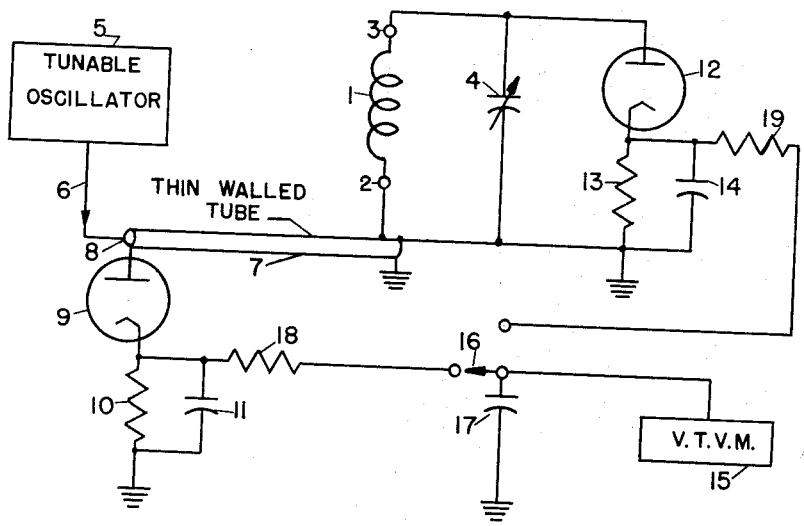
Fig. 1 shows a Q-meter circuit embodying my invention.

Referring to Fig. 1 there is schematically shown the essential circuit elements of a Q-meter having series injection of the input voltage. The element to be measured is represented as being the inductance 1, it being understood that other types of elements can be measured as well. The inductance 1 is adapted to be connected to the terminals 2 and 3 in any suitable manner. In practice the element to be measured may be plugged into the terminals 2 and 3, or other commonly known types of terminal connections may be provided. Terminals 2 and 3 are connected to variable condenser 4, which is adapted to resonate coil 1 to the frequency of oscillator 5. The oscillator is of the tunable type and may be made to cover a very wide frequency range by the use of band switching and other techniques well understood in the art. The oscillator may also contain means for adjusting its output. The output of oscillator 5 is impressed by a connection 6 on a thin-walled member or tube 7. The end of tube 7 remote from the oscillator is connected to ground and a portion of tube 7 near said end is included in the resonant circuit formed by inductance 1 and condenser 4. By connecting the terminal 2 to a suitable point on tube 7 a portion of the oscillator output is injected into resonant circuit 1, 4. A voltage measuring circuit comprises a rectifier 9 having its anode connected to the end 8 of tube 7. A load circuit consisting of resistor 10 and bypass condenser 11 is connected from the cathode of rectifier 9 to ground. A rectifier 12, which may be similar to rectifier 9 has its anode connected to one side of condenser 4 and its cathode connected to ground through a load circuit consisting of resistor 13 and condenser 14. The D. C. voltages across resistors 10 and 13 of the respective load circuits are measured by vacuum tube voltmeter 15. Voltmeter 15 is adapted to be connected to either of the load circuits 10, 11, or 13, 14, by means of switch 16. The connection between voltmeter 15 and each of the load circuits may include a filter consisting of condenser 17 and resistors 18 and 19. Tube 7 preferably may have a wall thickness of the order of .001 inch and a length which is very short compared to a wave length even at the highest frequency of the oscillator 5. The tube 7 may be, for example, one or several inches in length, and in any event has a length less than 1/20 of a wavelength. The element 7 may be a thin walled tube made of copper, silver, or a more resistive conductor, or any other suitable conductor. If desired, tube 7 may be provided with a core of non-conductive material or it may consist of a conductive coating on an insulating core. Other methods of providing a thin walled tube or an equivalent structure will be apparent to those skilled in the art.

The operation of the Q-meter shown in Fig. 1 is as follows:

The element to be measured, namely the inductance 1, is connected across condenser 4 and the voltmeter 15 is connected by switch 16 to the output of rectifier 9. Oscillator 5 is then adjusted to the frequency at which it is desired to measure the Q or other characteristic of inductance 1. The output of oscillator 5 is then adjusted to a suitable value, as read on voltmeter 15. Voltmeter 15 then is switched to the output of rectifier 12. Condenser 4 is adjusted until the circuit thereof is in resonance with oscillator 5, which resonance is indicated by a maximum reading on voltmeter 15. The ratio of the reading of the voltmeter 15 when it is connected to rectifier 12 to the reading of the voltmeter when it is connected to rectifier 9 is proportional to the Q of inductance 1. Also, the value of the inductance 1 can be determined from the capacity of condenser 4 at resonance.

Figure 2:
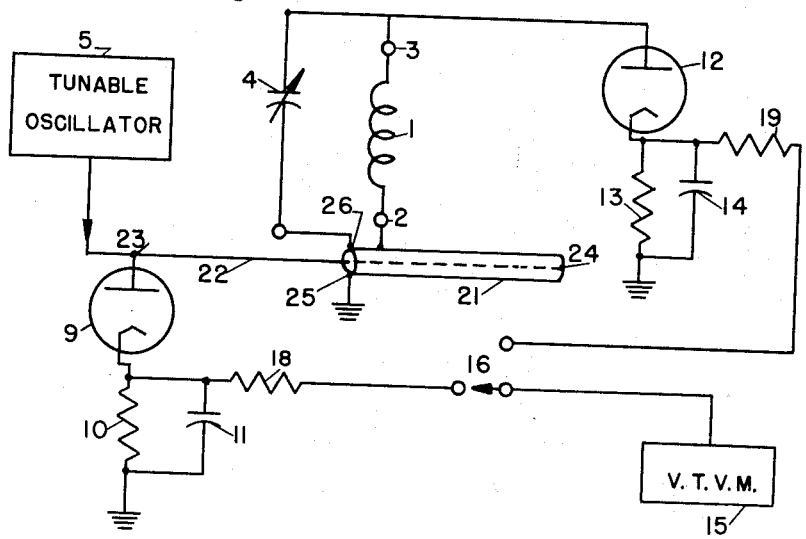
Fig. 2 shows a modification of the circuit shown in Fig. 1 constituting another embodiment of my invention.

Fig. 2 shows a modification of the circuit shown in Fig. 1. Similar elements in the two figures have been given the same reference symbols, and since their operation is the same the description thereof will not be repeated. The tube 21 is a thin-walled tube which may have the same dimensions and may be constructed in a manner similar to that of tube 7 of Fig. 1. However, tube 21 is provided with a coaxial conductor 22 having an end 23 connected to the oscillator 5 and having its other end 24 connected to the tube 21. The condenser 4 is connected to the grounded end 25 of tube 21 and the coil 1 is connected to a point on tube 21 which is removed from the point 25. Thereby a portion of tube 21 is connected in series with condenser 4 and inductance 1.

The system shown in Fig. 2 operates in the same manner as system of Fig. 1.

The systems of Figs. 1 and 2 provide simple, economical, and sturdy means of injecting and measuring the voltages in the resonant circuit. Since the skin effect is virtually eliminated from the coupling tubes 7 and 22, the resistance of the tubes, and hence the load on oscillator 5, will be almost constant with frequency. The tube is substantially non-reactive at all operating frequencies, and permits a very small determinable resistance proportional to the resistance of the entire tube at all operating frequencies, to be readily tapped off for inclusion in the resonant circuit. It will be obvious that many changes and modifications can be made within the spirit of my invention as described above and in the following claims.

I claim:

1. Apparatus for measuring the "Q" of a circuit element, comprising a tunable circuit adapted to include the element to be measured, a tunable oscillator, a coupling circuit connecting said oscillator to said tunable circuit, said coupling circuit comprising an elongated conductive tube having a wall thickness which is so small that the tube has an appreciable and substantially constant resistance throughout the frequency range of the oscillator, the entire length of said tube being connected in series in said coupling circuit and only a small portion of the length of said tube being connected in series in said tunable circuit, and means for selectively measuring the voltage impressed on said coupling circuit by said oscillator and the voltage across said tunable circuit.

2. The apparatus defined in claim 1, wherein said portion of the conductive tube is near one end thereof, there being a connection from the other end of said tube to the oscillator.

3. Apparatus for measuring the Q of a circuit element, comprising a tunable circuit adapted to include the element to be measured, a variable frequency oscillator, a coupling circuit connecting said oscillator to said tunable circuit, said coupling circuit comprising an elongated conductive tube having a perimeter which is small relative to its length and a wall thickness which is so small that the tube has an appreciable and substantially constant resistance throughout the frequency range of the oscillator, said tube being effectively connected in series in said coupling circuit and only a fractional portion of said tube being connected in series in said tunable circuit, and means for measuring the voltage supplied to said coupling circuit by said oscillator and the voltage across said tunable circuit, the length of said tube being less than 1/20 of a wave length at the highest frequency of said oscillator.

4. The apparatus defined in claim 3, wherein said tube is provided with a coaxial inner conductor having one end thereof connected to said oscillator and the other end connected to said tube.

5. Apparatus for measuring a characteristic of a circuit element, comprising a tunable circuit including a variable condenser and the element to be measured, a tunable oscillator, a coupling circuit connecting said oscillator to said tunable circuit, said coupling circuit comprising an elongated conductive member having a thickness which is so small and a length such that the member has an appreciable resistance but a negligible reactance throughout the frequency range of the oscillator, the entire member being effectively connected in series in said coupling circuit and only a fractional portion of the length of said member being connected in series in said tunable circuit, and means for measuring the voltage impressed on said coupling circuit by said oscillator and the voltage across said tunable circuit.

6. Apparatus for measuring the Q of a circuit element, comprising a tunable circuit including the element to be measured, a tunable oscillator, voltage dividing means for the output of the oscillator consisting solely of an elongated conductive tube having a wall thickness which is so small and a length such that the tube has an appreciable resistance but a negligible reactance throughout the frequency range of the oscillator, only a small portion of the length of said tube being connected in series in said tunable circuit, means connecting said tube to said oscillator, and means for selectively measuring the voltage impressed on said tube by said oscillator and the voltage across said tunable circuit.

7. Apparatus for measuring a characteristic of a circuit element, comprising a tunable circuit including the element to be measured, a tunable oscillator, a load for said oscillator consisting solely of an elongated conductive tube having one end connected to said oscillator and its other end grounded and having a wall thickness which is so small and a length such that the tube has an appreciable and substantially non-reactive impedance throughout the frequency range of the oscillator, a small portion of said tube near its grounded end being connected in series in said tunable circuit, and means for selectively measuring the voltage impressed on said tube by said oscillator and the voltage across said tunable circuit.

8. Apparatus for measuring the Q of a circuit element, comprising a tunable circuit adapted to include the element to be measured, a variable frequency oscillator, a coupling circuit connecting said oscillator to said tunable circuit, said coupling circuit comprising an elongated conductive tube having a perimeter which is small relative to its length and a wall thickness which is so small that the tube has an appreciable and substantially constant resistance throughout the frequency range of the oscillator, said tube being connected effectively in series in said coupling circuit and only a small portion of the length of said tube being connected in series in said tunable circuit, an insulating core, said tube consisting of a conductive coating on said core.

9. Apparatus for measuring the Q of a circuit element comprising a tunable circuit adapted to include the element to be measured, a variable frequency oscillator, voltage dividing means connecting said oscillator to said tunable circuit, said voltage dividing means consisting of a conductive tube having a perimeter which is small relative to its length and a wall thickness which is so small that the tube has an appreciable and substantially constant resistance throughout the frequency range of the oscillator, the entire tube being effectively connected across the output of said oscillator and only a small portion of the length of said tube being connected in series in said tunable circuit.

10. The apparatus defined in claim 9 wherein said tube is provided with a coaxial inner conductor, one end of said inner conductor and one end of said tube being connected together, the other end of said inner conductor and the other end of said tube being connected across the output of the oscillator.

JACOB ROSENBAUM.

References Cited in the file of this patent

UNITED STATES PATENTS

| Number | Name | Date |
|---|---|---|
| 2,387,096 | Smith | Oct. 16, 1945 |
| 2,412,055 | Meahl | Dec. 3, 1946 |
| 2,413,389 | Smith | Dec. 31, 1946 |
| 2,529,436 | Weber et al. | Nov. 7, 1950 |
| 2,602,838 | De Boisblanc et al. | July 8, 1952 |

OTHER REFERENCES

Ser. No. 610,660, Stewart (Abstract), published Aug. 16, 1949.